(12) United States Patent
Lee et al.

(10) Patent No.: US 11,269,435 B1
(45) Date of Patent: Mar. 8, 2022

(54) THREE-DIMENSIONAL SENSING PANEL AND METHOD OF MANUFACTURING THE SAME AND ELECTRONIC APPARATUS

(71) Applicant: TPK Advanced Solutions Inc., Fujian (CN)

(72) Inventors: Lien Hsin Lee, Taipei (TW); Yan Zhao, Fujian (CN); Jenchang Liu, Tainan (TW); Ren Hung Wang, Taichung (TW); Tai Shih Cheng, Taipei (TW); Jun Chen Zhong, Longyan (CN); Yuting Chan, Taoyuan (TW); Chu Chiang Lin, Taoyuan (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/016,568

(22) Filed: Sep. 10, 2020

(51) Int. Cl.
*G06F 3/041* (2006.01)

(52) U.S. Cl.
CPC .. *G06F 3/0412* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2014/0198072 A1* | 7/2014 | Schuele | G06F 3/043 345/174 |
| 2016/0117034 A1* | 4/2016 | Day | G06F 3/0446 345/174 |
| 2017/0177156 A1* | 6/2017 | Kitada | G06F 3/0445 |
| 2018/0095582 A1 | 4/2018 | Hwang et al. | |
| 2018/0143728 A1* | 5/2018 | Withers | G06F 3/0412 |

FOREIGN PATENT DOCUMENTS

| | | |
|---|---|---|
| CN | 110703935 A | 1/2020 |
| JP | 2017215960 A | 12/2017 |
| KR | 20070007809 A | 1/2007 |
| KR | 20160032263 A | 3/2016 |
| KR | 20160081949 A | 7/2016 |
| KR | 20190013700 A | 2/2019 |
| TW | 201905668 A | 2/2019 |
| TW | M607063 U | 2/2021 |

* cited by examiner

*Primary Examiner* — Brian M Butcher
(74) *Attorney, Agent, or Firm* — Cooper Legal Group, LLC

(57) ABSTRACT

A three-dimensional sensing panel includes a cover plate, a two-dimensional touch sensing module, a pressure sensing coating layer, and a light-transmitting electrode layer. The cover plate defines thereon a touch area and a peripheral area surrounding the touch area. The two-dimensional touch sensing module is disposed at the touch area. The pressure sensing coating layer is coated at a side of the two-dimensional touch sensing module away from the cover plate. The light-transmitting electrode layer is coated at a side of the pressure sensing coating layer away from the two-dimensional touch sensing module.

21 Claims, 5 Drawing Sheets

THREE-DIMENSIONAL SENSING PANEL AND METHOD OF MANUFACTURING THE SAME AND ELECTRONIC APPARATUS

BACKGROUND

Technical Field

The present disclosure relates to a three-dimensional sensing panel and a method of manufacturing the same and an electronic apparatus.

Description of Related Art

With the diversified development of touch modules, touch modules have been maturely applied to industrial electronics and consumer electronics products. Demand has progressed from determining the two-dimensional position (e.g., the X-axis direction and the Y-axis direction) of the touch point on the surface of the screen to also sensing the force parameter caused by the change of the force applied to the surface of the screen (e.g., the Z-axis direction). Even the application requirements for flexible panels will be inevitable.

However, in a conventional three-dimensional touch-pressure integrated panel, the pressure sensor is usually mounted above or below a two-dimensional touch panel. This manufacturing method not only cannot integrate with the conventional manufacturing processes, but also requires the use of additional adhesive (optically clear adhesive (OCA)). Furthermore, in the design of this kind of out-cell touch-pressure integrated panel, in addition to the cover plate, an additional transparent film is needed to cover the pressure sensor for protection. Therefore, an additional manufacturing process is required and additional costs are incurred.

Accordingly, how to provide a three-dimensional sensing panel to solve the aforementioned problems has become an important issue to be solved by those in the industry.

SUMMARY

An aspect of the disclosure is to provide a three-dimensional sensing panel that can efficiently solve the aforementioned problems.

According to an embodiment of the disclosure, a three-dimensional sensing panel includes a cover plate, a two-dimensional touch sensing module, a pressure sensing coating layer, and a light-transmitting electrode layer. The cover plate defines thereon a touch area and a peripheral area surrounding the touch area. The two-dimensional touch sensing module is disposed at the touch area. The pressure sensing coating layer is coated at a side of the two-dimensional touch sensing module away from the cover plate. The light-transmitting electrode layer is coated at a side of the pressure sensing coating layer away from the two-dimensional touch sensing module.

In an embodiment of the disclosure, a material of the pressure sensing coating layer includes polyvinylidene difluoride (PVDF).

In an embodiment of the disclosure, a thickness of the pressure sensing coating layer is in a range from about 7 μm to about 10 μm.

In an embodiment of the disclosure, the two-dimensional touch sensing module is a one glass solution single-sided indium tin oxide (OGS-SITO) type touch module.

In an embodiment of the disclosure, the light-transmitting electrode layer is a silver nanowire electrode layer.

In an embodiment of the disclosure, a value of L* axis of CIELAB color space of the three-dimensional sensing panel is equal to or greater than 92.

In an embodiment of the disclosure, a value of a* axis of CIELAB color space of the three-dimensional sensing panel is in a range from about −1.5 to about 1.5.

In an embodiment of the disclosure, a value of b* axis of CIELAB color space of the three-dimensional sensing panel is in a range from about −2 to about 2.

In an embodiment of the disclosure, the pressure sensing coating layer includes a plurality of pressure sensing blocks. The pressure sensing blocks are spaced apart from each other.

In an embodiment of the disclosure, the light-transmitting electrode layer includes a plurality of electrode blocks. The electrode blocks are spaced apart from each other and respectively contact the pressure sensing blocks.

According to an embodiment of the disclosure, an electronic apparatus includes the aforementioned three-dimensional sensing panel and a display module. The display module is disposed at a side of the light-transmitting electrode layer away from the pressure sensing coating layer.

According to an embodiment of the disclosure, a method of manufacturing a three-dimensional sensing panel includes: disposing a two-dimensional touch sensing module on a cover plate; coating a polymer coating layer on a side of the two-dimensional touch sensing module away from the cover plate; drying the polymer coating layer to form a dried polymer coating layer; coating a light-transmitting electrode layer on a side of the dried polymer coating layer away from the two-dimensional touch sensing module; and poling the dried polymer coating layer to transform the dried polymer coating layer into a pressure sensing coating layer.

In an embodiment of the disclosure, the coating the light-transmitting electrode layer is performed before the poling the dried polymer coating layer.

In an embodiment of the disclosure, the coating the light-transmitting electrode layer is performed after the poling the dried polymer coating layer.

Accordingly, in the three-dimensional sensing panel of the present disclosure, the two-dimensional touch sensing module adopts the OGS architecture, and the pressure sensing coating layer and the light-transmitting electrode layer are sequentially formed on the two-dimensional touch sensing module by coating processes. Therefore, the use of adhesive can be omitted, which can effectively reduce the overall thickness and manufacturing cost. In addition, the two-dimensional touch sensing module using the OGS architecture also has a smaller thickness than a two-dimensional touch sensing module using the GFF architecture (that is, the OGS architecture uses a dielectric layer as a bridge to concentrate the touch sensing electrode layer to a thickness of a single layer, while eliminating the thickness of using adhesive to stack a multi-layer structure of the GFF architecture and the resulting reduction in force transmission rate), which can provide excellent signal conduction characteristics and is conducive to the efficiency of extracting power signals.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
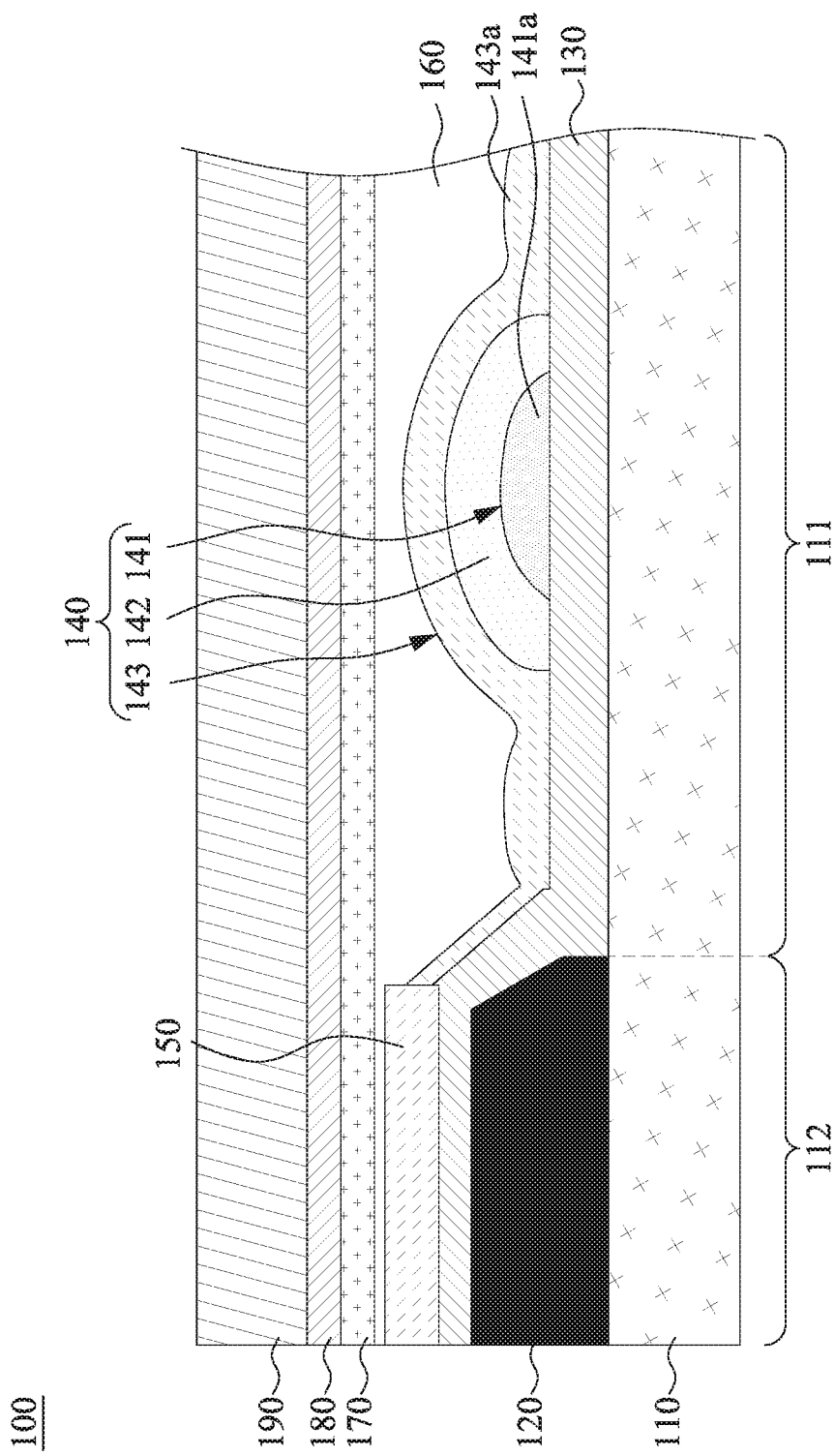
FIG. 1 is a schematic diagram of an electronic apparatus according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of an electronic apparatus 100 according to an embodiment of the disclosure. As shown in FIG. 1, the electronic apparatus 100 of the present embodiment is a touch display device as an example and includes a three-dimensional sensing panel and a display module 190. The display module 190 is disposed under the three-dimensional sensing panel.

Specifically, the three-dimensional sensing panel includes a cover plate 110, a shielding layer 120, an optical matching layer 130, and a plurality of traces 150 (only one is shown in FIG. 1). The cover plate 110 defines thereon a touch area 111 and a peripheral area 112 surrounding the touch area 111. The shielding layer 120 is disposed in the peripheral area 112 of the cover plate 110. The optical matching layer 130 is disposed on the cover plate 110 and covers the shielding layer 120, so as to provide a flat upper surface in the touch area 111. The traces 150 are disposed on the optical matching layer 130 and located in the peripheral area 112. Hence, when viewed from the bottom surface of the cover plate 110, the shielding layer 120 can shield the traces 150 from the viewer.

In some embodiments, a material of the cover plate 110 includes glass, but the disclosure is not limited in this regard.

Figure 1A:
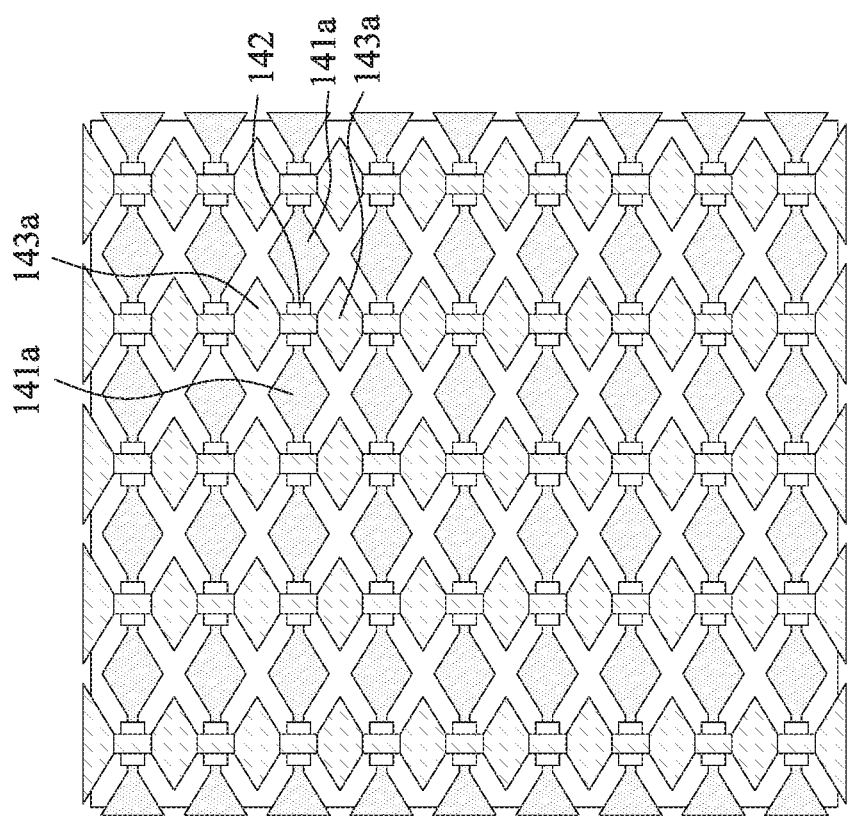
FIG. 1A is a top view of a two-dimensional touch sensing module in FIG. 1.

Reference is made to FIG. 1A. FIG. 1A is a top view of a two-dimensional touch sensing module 140 in FIG. 1. As shown in FIGS. 1 and 1A, the three-dimensional sensing panel further includes the two-dimensional touch sensing module 140. The two-dimensional touch sensing module 140 is disposed at the touch area 111 and includes a first touch sensing electrode layer 141, a dielectric layer 142, and a second touch sensing electrode layer 143. The first touch sensing electrode layer 141 is disposed on the optical matching layer 130 and includes a plurality of first-axis conductive units 141a which are spaced apart from each other in the touch area 111 (as shown in FIG. 1A). The second touch sensing electrode layer 143 is disposed on the optical matching layer 130 and includes a plurality of second-axis conductive units 143a which are spaced apart from each other in the touch area 111 and cross the first-axis conductive units 141a. More specifically, the first-axis conductive units 141a may be a plurality of diamond electrodes connected in series to form a first-axis conductive channel (as shown in FIG. 1A), but the shape of the electrodes is not limited in this regard and can be other electrode shapes. A plurality of the first-axis conductive channels form the first touch sensing electrode layer 141. Similarly, the second-axis conductive units 143a may be a plurality of diamond-shaped electrodes connected in series to form a second-axis conductive channel (as shown in FIG. 1A), but the shape of the electrodes is not limited in this regard and can be other electrode shapes. A plurality of the second-axis conductive channels form the second touch sensing electrode layer 143.

The dielectric layer 142 covers the first-axis conductive units 141a to electrically isolate the first-axis conductive units 141a from the second-axis conductive units 143a. Hence, the touch signal (such as a mutual capacitance sensing signal) between the first touch sensing electrode layer 141 and the second touch sensing electrode layer 143 can be extracted through the traces 150.

Specifically, the aforementioned "first-axis" and "second-axis" are, for example, two mutually perpendicular axes (e.g., X axis and Y axis). In other words, the first-axis conductive units 141a (and the first-axis conductive channels) are conductive lines extending along the first axis and can be arranged at intervals along the second axis. The second-axis conductive units 143a (and second-axis conductive channels) are conductive lines extending along the second axis and can be arranged at intervals along the first axis.

In addition, the second-axis conductive units 143a cross the first-axis conductive units 141a from above, and the dielectric layer 142 electrically insulates at least at the intersections between the first-axis conductive units 141a and the second-axis conductive units 143a. It can be seen that the second touch sensing electrode layer 143 is separated from the first touch sensing electrode layer 141 by the dielectric layer 142 to form bridge-like structures, so the two-dimensional touch sensing module 140 of the present embodiment is an OGS-SITO (One Glass Solution single-sided indium tin oxide (ITO)) type touch module.

As shown in FIG. 1, the three-dimensional sensing panel further includes a pressure sensing coating layer 160 and a light-transmitting electrode layer 170. The pressure sensing coating layer 160 is coated at a side of the two-dimensional touch sensing module 140 away from the cover plate 110. The light-transmitting electrode layer 170 is coated at a side of the pressure sensing coating layer 160 away from the two-dimensional touch sensing module 140. A force signal generated by the pressure sensing coating layer 160 can be extracted through the light-transmitting electrode layer 170.

In some embodiments, a material of the pressure sensing coating layer 160 includes polyvinylidene difluoride (PVDF). In other words, the pressure sensing coating layer 160 is a lattice piezoelectric material. When a pressure is applied to a certain direction of crystal of this material to produce deformation, the magnitudes and the directions of the dipoles also change, so the amount of charge also changes, thereby generating a voltage.

In some embodiments, a thickness of the pressure sensing coating layer 160 is in a range from about 7 µm to about 10 µm (preferably about 8 µm).

With the foregoing configuration, since the two-dimensional touch sensing module 140 adopts the OGS architecture and the pressure sensing coating layer 160 and the light-transmitting electrode layer 170 are sequentially formed on the two-dimensional touch sensing module 140 by coating processes, the adhesive used to integrate the two-dimensional touch panel and the external pressure sensor in the conventional three-dimensional touch-pressure integrated panel can be omitted, which can effectively reduce the overall thickness and manufacturing cost.

Figure 3:
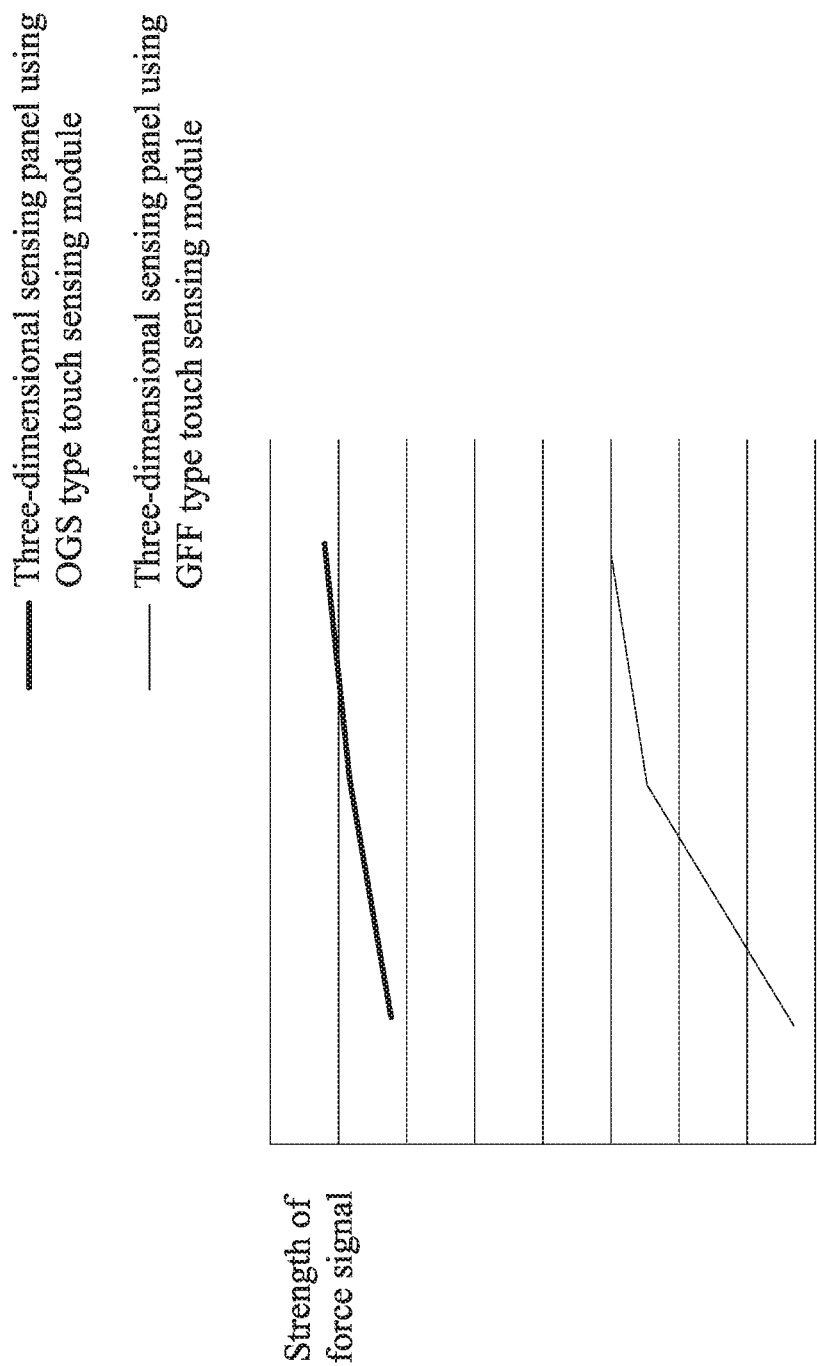
FIG. 3 is a force vs. strength of force signal graph of three-dimensional sensing panels respectively using a one glass solution (OGS) type touch sensing module and a glass-film-film (GFF) type touch sensing module.

Reference is made to FIG. 3. FIG. 3 is a force vs. strength of force signal graph of three-dimensional sensing panels respectively using an OGS type touch sensing module and a GFF (Glass-Film-Film) type touch sensing module. For example, the experimental targets used to produce the graph shown in FIG. 3 may be the three-dimensional sensing panel shown in FIG. 1 and another three-dimensional sensing panel using a touch sensor model of the GFF architecture. It can be clearly seen from FIG. 3 that the strength of force signal obtained by the three-dimensional sensing panel using the OGS type touch sensing module under the same force is significantly greater than that of the three-dimensional sensing panel using the GFF type touch sensing module, which helps increase the efficiency of extracting the signal of force. The reason why the two-dimensional touch sensing module 140 adopting the OGS architecture in this embodiment can provide excellent signal transmission characteristics is that the two-dimensional touch sensing module 140 has a smaller thickness, while the GFF type touch-sensing module has a large thickness due to the adhesive needed to adhere the two films. It can also be said that the excessive thickness of the GFF structure due to the multi-layer stack structure will cause force transmission attenuation, resulting in less obvious strength of force signal that can be extracted by pressure sensing.

As shown in FIG. 1, the three-dimensional sensing panel further includes an adhesive 180. The display module 190 is adhered to a side of the light-transmitting electrode layer 170 away from the pressure sensing coating layer 160.

In some embodiments, the light-transmitting electrode layer 170 can be a silver nanowire (SNW; also known as AgNW) electrode layer. In detail, the light-transmitting electrode layer 170 includes a substrate and silver nanowires doped therein. The silver nanowires overlap each other in the substrate to form a conductive network. The substrate refers to a non-nanosilver material formed by a solution including the silver nanowires through processes such as coating, heating, and drying. The silver nanowires are distributed or embedded in the substrate and partially protrude out from the substrate. The substrate can protect the silver nanowires from the external environment, such as protecting the silver nanowires from corrosion and abrasion. In some embodiments, the substrate is compressible.

In some embodiments, a wire length of the silver nanowires ranges from about 10 µm to about 300 µm. In some embodiments, a wire diameter (or a wire width) of the silver nanowires is less than about 500 nm. In some embodiments, an aspect ratio of the silver nanowires (the ratio of the wire length to the wire diameter) is greater than 10. In some embodiments, the silver nanowires can be deformed forms such as other conductive metal nanowires or non-conductive nanowires coated with silver. The use of the silver nanowires to form the silver nanowire electrode layer has the following advantages compared with ITO: low price, simple process, good flexibility, resistance to bending, and etc.

In some embodiments, at least one of the first touch sensing electrode layer 141 or the second touch sensing electrode layer 143 can be a silver nanowire electrode layer, a metal grid, or an indium tin oxide (ITO) electrode layer, but the disclosure is not limited in this regard.

In some embodiments, the three-dimensional sensing panel has an optical transmittance (to visible light having wavelengths in a range of wavelength of 400-700 nm) greater than 90% and a haze less than 3%. In order to make the three-dimensional sensing panel meet the aforementioned requirements for optical transmittance and haze, in some embodiments, at least one of the first touch sensing electrode layer 141 or the second touch sensing electrode layer 143 is a silver nanowire electrode layer.

In some embodiments, a value of L* axis (i.e., the luminance axis) of CIELAB color space of the three-dimensional sensing panel measured by a colorimeter is equal to or greater than 92, but the disclosure is not limited in this regard.

In some embodiments, a value of a* axis (i.e., the red-green axis) of CIELAB color space of the three-dimensional sensing panel measured by a colorimeter is in a range from about −1.5 to about 1.5, but the disclosure is not limited in this regard.

In some embodiments, a value of b* axis (i.e., the yellow-blue axis) of CIELAB color space of the three-dimensional sensing panel is in a range from about −2 to about 2, but the disclosure is not limited in this regard.

Figure 2:
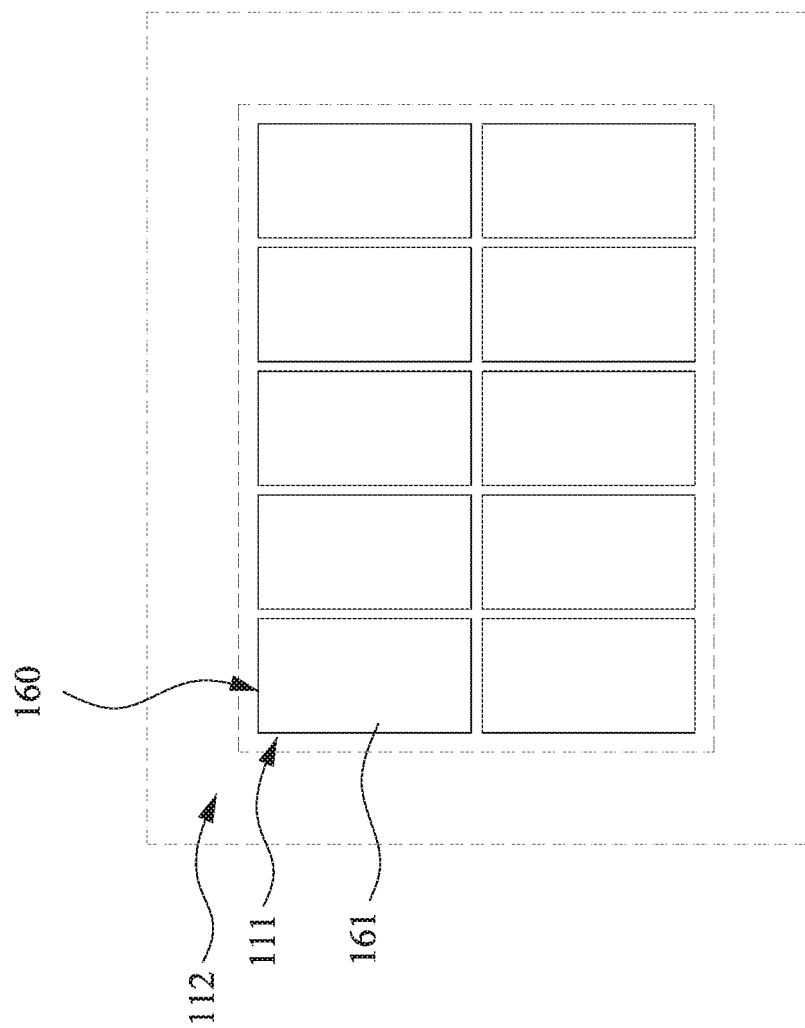
FIG. 2 is a top view of a pressure sensing coating layer according to an embodiment of the disclosure.

Reference is made to FIG. 2. FIG. 2 is a top view of the pressure sensing coating layer 160 according to an embodiment of the disclosure. As shown in FIG. 2, the pressure sensing coating layer 160 includes a plurality of pressure sensing blocks 161. The pressure sensing blocks 161 are spaced apart from each other. Moreover, the light-transmitting electrode layer 170 includes a plurality of electrode blocks (not shown, please refer to the shape of the pressure sensing blocks 161). The electrode blocks are spaced apart from each other and respectively contact the pressure sensing blocks 161. Hence, the force signal generated by an individual one of the pressure sensing blocks 161 can be extracted through a corresponding one of the electrode blocks, thereby achieving the ability to perform multi-finger pressure-sensing detection.

Figure 4:
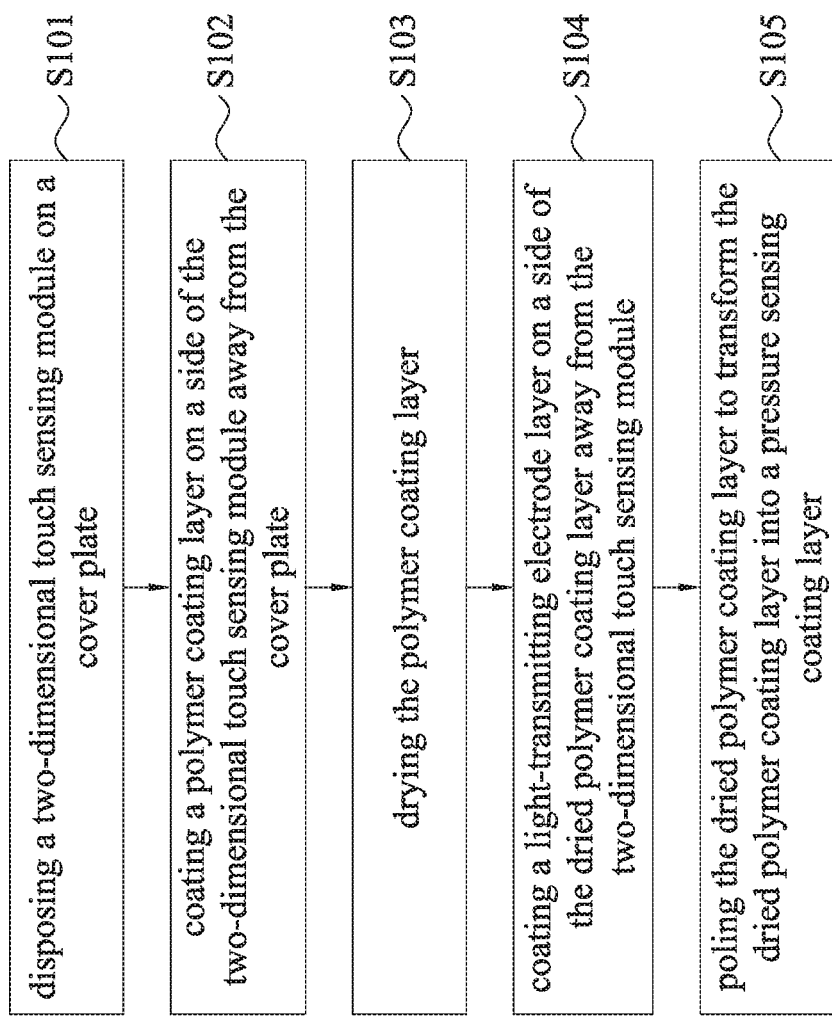
FIG. 4 is a flowchart of a method of manufacturing a three-dimensional sensing panel according to an embodiment of the disclosure.

Reference is made to FIG. 4. FIG. 4 is a flowchart of a method of manufacturing a three-dimensional sensing panel according to an embodiment of the disclosure. As shown in FIG. 4, the method includes steps S101 to S105.

In step S101, a two-dimensional touch sensing module is disposed on a cover plate.

In step S102, a polymer coating layer is coated on a side of the two-dimensional touch sensing module away from the cover plate.

In some embodiments, step S102 can be performed by a printing process, but the disclosure is not limited in this regard.

In step S103, the polymer coating layer is dried.

In some embodiments, step S103 can be performed by baking the polymer coating layer at a temperature of about 60 degrees Celsius for about 30 minutes, and then annealing the polymer coating layer at a temperature of about 135 degrees Celsius for about 30 minutes, but the disclosure is not limited in this regard.

In step S104, a light-transmitting electrode layer is coated on a side of the dried polymer coating layer away from the two-dimensional touch sensing module.

In some embodiments, step S104 can be performed by a spin coating process with a rotation speed of about 3000 rpm, but the disclosure is not limited in this regard.

In step S105, the dried polymer coating layer is polied to transform the dried polymer coating layer into a pressure sensing coating layer.

In some embodiments, a material of the polymer coating layer includes PVDF. Before the polymer coating layer is polied, the directions of the dipoles are arranged randomly. When poling the dried polymer coating layer, an electric field can be applied to the dried polymer coating layer so that the directions of the dipoles are aligned in the forward direction based on the magnetic field lines of the electric field.

In the present embodiment, although the step of coating the light-transmitting electrode layer (i.e., step S104) is performed before the step of poling the dried polymer coating layer (i.e., step S105), in other embodiments, the step of coating the light-transmitting electrode layer can be performed after the step of poling the dried polymer coating layer.

According to the foregoing recitations of the embodiments of the disclosure, it can be seen that in the three-dimensional sensing panel of the present disclosure, the two-dimensional touch sensing module adopts the OGS architecture, and the pressure sensing coating layer and the light-transmitting electrode layer are sequentially formed on the two-dimensional touch sensing module by coating processes. Therefore, the use of adhesive can be omitted, which can effectively reduce the overall thickness and manufacturing cost. In addition, the two-dimensional touch sensing module using the OGS architecture also has a smaller thickness than a two-dimensional touch sensing module using the GFF architecture (that is, the OGS architecture uses a dielectric layer as a bridge to concentrate the touch sensing electrode layer to a thickness of a single layer, while eliminating the thickness of using adhesive to stack a multi-layer structure of the GFF architecture and the resulting reduction in force transmission rate), which can provide excellent signal conduction characteristics and is conducive to the efficiency of extracting power signals.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A three-dimensional sensing panel, comprising:
a cover plate defining thereon a touch area and a peripheral area surrounding the touch area;
a two-dimensional touch sensing module disposed at the touch area;
a pressure sensing coating layer disposed and in contact with a side of the two-dimensional touch sensing module away from the cover plate; and
a light-transmitting electrode layer disposed and in contact with a side of the pressure sensing coating layer away from the two-dimensional touch sensing module, wherein a value of a* axis of CIELAB color space of the three-dimensional sensing panel is in a range from about −1.5 to about 1.5.

2. The three-dimensional sensing panel of claim 1, wherein a material of the pressure sensing coating layer comprises polyvinylidene difluoride (PVDF).

3. The three-dimensional sensing panel of claim 1, wherein a thickness of the pressure sensing coating layer is in a range from about 7 μm to about 10 μm.

4. The three-dimensional sensing panel of claim 1, wherein the two-dimensional touch sensing module is a one glass solution single-sided indium tin oxide (OGS-SITO) type touch module.

5. The three-dimensional sensing panel of claim 1, wherein the light-transmitting electrode layer is a silver nanowire electrode layer.

6. The three-dimensional sensing panel of claim 1, wherein a value of L* axis of CIELAB color space of the three-dimensional sensing panel is equal to or greater than 92.

7. The three-dimensional sensing panel of claim 1, wherein a value of b* axis of CIELAB color space of the three-dimensional sensing panel is in a range from about −2 to about 2.

8. The three-dimensional sensing panel of claim 1, wherein the pressure sensing coating layer comprises a plurality of pressure sensing blocks spaced apart from each other.

9. The three-dimensional sensing panel of claim 8, wherein the light-transmitting electrode layer comprises a plurality of electrode blocks spaced apart from each other and respectively contacting the pressure sensing blocks.

10. A method of manufacturing a three-dimensional sensing panel, comprising:
disposing a two-dimensional touch sensing module on a cover plate;
coating a polymer coating layer on a side of the two-dimensional touch sensing module away from the cover plate;
drying the polymer coating layer to form a dried polymer coating layer;
coating a light-transmitting electrode layer on a side of the dried polymer coating layer away from the two-dimensional touch sensing module; and
poling the dried polymer coating layer to transform the dried polymer coating layer into a pressure sensing coating layer.

11. The method of claim 10, wherein the coating the light-transmitting electrode layer is performed before the poling the dried polymer coating layer.

12. The method of claim 10, wherein the coating the light-transmitting electrode layer is performed after the poling the dried polymer coating layer.

13. The three-dimensional sensing panel of claim 1, wherein
the two-dimensional touch sensing module comprises a first touch sensing electrode layer and a second touch sensing electrode layer,
the second touch sensing electrode layer is disposed at a side of the first touch sensing electrode layer away from the cover plate, and
the pressure sensing coating layer is disposed and in contact with a side of the second touch sensing electrode layer away from the cover plate.

14. A three-dimensional sensing panel, comprising:
a cover plate defining thereon a touch area and a peripheral area surrounding the touch area;
a two-dimensional touch sensing module disposed at the touch area;
a pressure sensing coating layer disposed and in contact with a side of the two-dimensional touch sensing module away from the cover plate; and
a light-transmitting electrode layer disposed and in contact with a side of the pressure sensing coating layer away from the two-dimensional touch sensing module, wherein a value of b* axis of CIELAB color space of the three-dimensional sensing panel is in a range from about −2 to about 2.

15. The three-dimensional sensing panel of claim 14, wherein a value of L* axis of CIELAB color space of the three-dimensional sensing panel is equal to or greater than 92.

16. The three-dimensional sensing panel of claim 14, wherein the pressure sensing coating layer comprises a plurality of pressure sensing blocks spaced apart from each other.

17. The three-dimensional sensing panel of claim 16, wherein the light-transmitting electrode layer comprises a plurality of electrode blocks spaced apart from each other and respectively contacting the pressure sensing blocks.

18. The three-dimensional sensing panel of claim 14, wherein
the two-dimensional touch sensing module comprises a first touch sensing electrode layer and a second touch sensing electrode layer,
the second touch sensing electrode layer is disposed at a side of the first touch sensing electrode layer away from the cover plate, and
the pressure sensing coating layer is disposed and in contact with a side of the second touch sensing electrode layer away from the cover plate.

19. The three-dimensional sensing panel of claim 14, wherein a material of the pressure sensing coating layer comprises polyvinylidene difluoride (PVDF).

20. The three-dimensional sensing panel of claim 14, wherein a thickness of the pressure sensing coating layer is in a range from about 7 μm to about 10 μm.

21. The three-dimensional sensing panel of claim 14, wherein the two-dimensional touch sensing module is a one glass solution single-sided indium tin oxide (OGS-SITO) type touch module.

* * * * *